(12) United States Patent
Seidl et al.

(10) Patent No.: US 8,806,596 B2
(45) Date of Patent: Aug. 12, 2014

(54) AUTHENTICATION TO AN IDENTITY PROVIDER

(75) Inventors: Robert Seidl, Königsdorf (DE); Gabor Marton, Budapest (HU); Markus Bauer-Hermann, Aicha vorm Wald (DE)

(73) Assignee: Nokia Solutions and Networks Oy, Espoo (FI)

( * ) Notice: Subject to any disclaimer, the term of this patent is extended or adjusted under 35 U.S.C. 154(b) by 187 days.

(21) Appl. No.: 13/144,970

(22) PCT Filed: Feb. 5, 2010

(86) PCT No.: PCT/EP2010/051393
§ 371 (c)(1),
(2), (4) Date: Aug. 11, 2011

(87) PCT Pub. No.: WO2010/094578
PCT Pub. Date: Aug. 26, 2010

(65) Prior Publication Data
US 2011/0289573 A1  Nov. 24, 2011

(30) Foreign Application Priority Data
Feb. 19, 2009  (EP) .................. PCT/EP2009/051964

(51) Int. Cl.
*H04L 29/06* (2006.01)
(52) U.S. Cl.
USPC .................. 726/7; 726/5; 726/21; 726/27
(58) Field of Classification Search
CPC .. H04L 63/0815; H04L 63/0853; H04L 63/18
USPC ....................... 726/4–7, 21, 27–29
See application file for complete search history.

(56) References Cited

U.S. PATENT DOCUMENTS

| | | | |
|---|---|---|---|
| 2003/0070091 A1* | 4/2003 | Loveland | 713/201 |
| 2004/0030935 A1* | 2/2004 | Kai | 713/202 |
| 2004/0174965 A1* | 9/2004 | Brahm et al. | 379/88.19 |

(Continued)

FOREIGN PATENT DOCUMENTS

| | | |
|---|---|---|
| EP | 1919156 | 5/2008 |
| RU | 53085 U1 | 4/2006 |
| RU | 2311676 C2 | 11/2007 |
| RU | 2346406 C2 | 2/2009 |
| RU | 2346460 C1 | 2/2009 |

OTHER PUBLICATIONS

J. Franks et al., HTTP Authentication: Basic and Digest Access Authentication, Network Working Group, RFC 2617, Jun. 1999, pp. 1-34.

(Continued)

*Primary Examiner* — Chau Le
(74) *Attorney, Agent, or Firm* — Squire Patton Boggs (US) LLP

(57) ABSTRACT

An arrangement for authenticating a user at a service provider is described. The arrangement makes use of the fact that a user of a mobile communication device can be readily and securely identified by a telecommunications provider and re-uses that authentication to identify the same user when accessing the service provider from a different client. The client instructs the mobile communication device to contact an identity provider at the telecommunications provider and shared secrets are exchanged between the identity provider, mobile communication device and client to confirm that the same user is at the client and the mobile communication device.

21 Claims, 4 Drawing Sheets

(56) References Cited

U.S. PATENT DOCUMENTS

| | | | |
|---|---|---|---|
| 2006/0005263 A1* | 1/2006 | Hardt | 726/28 |
| 2006/0206709 A1* | 9/2006 | Labrou et al. | 713/167 |
| 2007/0016796 A1* | 1/2007 | Singhal | 713/183 |
| 2008/0046988 A1* | 2/2008 | Baharis et al. | 726/7 |
| 2008/0086770 A1* | 4/2008 | Kulkarni et al. | 726/20 |
| 2008/0098225 A1* | 4/2008 | Baysinger | 713/171 |
| 2008/0119165 A1 | 5/2008 | Mittal et al. | |
| 2008/0281737 A1* | 11/2008 | Fajardo | 705/35 |
| 2008/0309961 A1 | 12/2008 | Aichi et al. | |
| 2009/0287921 A1* | 11/2009 | Zhu et al. | 713/155 |
| 2009/0288155 A1* | 11/2009 | Joshi et al. | 726/9 |
| 2010/0100725 A1* | 4/2010 | Ozzie et al. | 713/155 |
| 2010/0287606 A1* | 11/2010 | Machani | 726/7 |

OTHER PUBLICATIONS

Shintaro Mizuno et al., Authentication Using Multiple Communication Channels, Proceedings of the 2005 Workshop on Digital Identity Management, 2005, pp. 54-62.

Do van Thanh et al., Offering SIM Strong Authentication to Internet Services, Internet Citation, Oct. 2006, pp. 1-20.

Russian Decision to Grant dated Sep. 11, 2013, with partial English language translation for corresponding Russian Application No. 2011138098/08(056868).

* cited by examiner

AUTHENTICATION TO AN IDENTITY PROVIDER

The present invention is related to the field of identity management and service access control.

Identity brokering is an approach to single sign-on, in which a client does not directly provide authentication information to a service provider. FIG. 1 shows a system, indicated generally by the reference numeral 1, comprising a client 2, a service provider 4 and an identity provider 6. In the system 1, the service provider 4 obtains an authentication assertion containing a service provider-specific user identifier from the identity provider 6, and (assuming that the authentication assertion refers to an existing user at the service provider 4), the service provider provides the personalized service to the client 2.

FIG. 2 shows a message sequence, indicated generally by the reference numeral 10, that can be used for providing user authentication information to the service provider 4. The message sequence 10 makes use of the Security Assertion Markup Language (SAML) protocol. SAML is an XML (eXtensible Markup Language) standard for exchanging authentication and authorization data between security domains. For example, SAML is used for exchanging assertion data between an identity provider (a producer of assertions) and a service provider (a consumer of assertions). SAML is a specification defined by the OASIS (Organization for the Advancement of Structured Information Standards).

The message sequence 10 begins with the client 2 issuing an HTTP request 12 to the service provider 4, requesting access to a secure resource at the service provider. In response to the request 12, the service provider 4 issues an HTTP redirect message 14 to the client, instructing the client to obtain user credentials from a particular identity provider. The user browser then sends a SAML authentication request 16 to the identity provider 6 indicated in the redirect message 14.

In response to the request 16, the identity provider 6 replies with an HTTP redirect message 18, including the requested SAML assertion. Next, the client 2 sends a SAML authentication response 20 to the service provider 4, including the SAML assertion obtained from the identity provider 6. Once the SAML assertion has been verified by the service provider 4, the service provider provides the user with access to the requested secure resource and sends an HTTP response 22 to the client 2.

The message sequence 10 described above with reference to FIG. 2 is one of many mechanisms that could be used for providing user credentials to the service provider 4. The skilled person will be aware of many alternatives, including, for example, mechanisms in accordance with the Generic Bootstrapping Architecture (GBA), OpenID and Windows® CardSpace protocols.

Telecommunication operators, such as mobile network operators, are in a particularly good position for acting as identity providers, since they maintain a trustful relationship with their customers. Mobile communication devices are currently authenticated in a secure manner. Mobile communication devices can also be used to access services, however many users prefer to use personal computers, such as laptops, for accessing services, for example over the Internet. Personal computers and similar client devices typically offer better performance and display functionality than mobile communication devices. Personal computers, however, typically provide inferior authentication methods than mobile communication devices.

FIG. 3 is a block diagram of a system, indicated generally by the reference numeral 30, that attempts to combine the advantages of personal computer based service access (high performance, good display etc.) and the advantages of mobile communication devices (strong authentication). The system 30 comprises a client device 32 (such as a personal computer), a network 34 (such as the Internet), a service provider 36, a user equipment (UE) 38, a mobile network 40 and an authentication module 42.

The UE 38 makes use of the mobile network 40 to make telephone calls, send SMS messages etc. The authentication module 42 is coupled to the mobile network 40 and is used to authenticate the UE 38 in a manner well known in the art.

The client device 32 uses the Internet 34 (via a browser of the client device) to connect to a service provider 36. In order to access services provided by the service provider 36, the user client needs to be identified. The service provider 36 can obtain identification information from the authentication module 42.

In order to provide authentication information, the authentication module 42 and/or the service provider 36 need to be convinced that the same user is operating both the UE 38 and the user client 32. One approach is for the authentication module 42 to send a one-time password (OTP) to the UE 38 in the mobile network 40 (for example, in the form of an SMS message). The user enters this password at the user client 32 in order to demonstrate that the same user is using both the UE (where the OTP is received by the user) and the user client (where the OTP is entered by the user). However, such an arrangement is inconvenient for the user as it requires a number of steps. Also, the use of SMS is not secure.

There remains a need for an arrangement for providing user authentication information to a service provider, in order to enable the service provider to grant access to the user, in a manner that is convenient for the user and exploits the fact that the user is also the user of a mobile communication device, the user of which can readily be identified.

The present invention seeks to address at least some of the problems outlined above.

According to an aspect of the present invention, there is provided a method (for example, for authenticating a user at a service provider using an identity provider provided by a telecommunication network provider), the method comprising: receiving, at an identity provider provided by a telecommunications network provider, a request (such as an HTTP or HTTPS request) from a client for user credentials required to access a service provider; sending an authentication request (such as an HTTP Unauthorised response) from the identity provider to the client, the authentication request including a first reference; receiving, at the identity provider (or any other function that the identity provider trusts), a request from a mobile communication device to identify a user at the client, the request including a second reference, wherein the mobile communication device makes use of the network provided by the telecommunication network provider and is known to an authentication server provided by the telecommunication network provider; and comparing the first and second references and, if they are the same, obtaining identification information (e.g. IMSI etc.) for the user of the mobile communication device (which user is the same as the user of the client) from the authentication server provided by the telecommunication network provider. The comparing step may be carried out by the identity provider or by another module or function trusted by the identity provider. In some forms of the invention, the identity provider receives the second reference: in other forms of the invention, the identity provider does not receive the second reference (for example, it may be received by a separate module that is trusted by the identity provider).

According to an aspect of the present invention, there is provided a method (for example, for authenticating a user at a service provider using an identity provider provided by a telecommunication network provider), the method comprising: sending a request from a client to an identity provider (either directly or via an intermediary such as a service provider that redirects the client to the identity provider) requesting user credentials required to access a service provider; receiving, at the client, an authentication request from the identity provider, wherein the authentication request includes a first reference; using the client to send a request to a mobile communication device that is also being used by the user of the client to identify the client at an identity provider, wherein the request includes the first reference, wherein the identity provider is provided by the provider of a telecommunications network to the mobile communications device, and wherein the mobile communication device is known to an authentication server provided by the provider of the telecommunications network; using the mobile communication device to send a request to the identity provider (or to any other function trusted by the identity provider) to identify the user of the client, the request to identify the user including the first reference; comparing, at the identity provider (or another function trusted by the identity provider), the reference sent to the client and the reference received from the mobile communication device; and using the identity provider to obtain identification information for the user of the mobile communication device from the authentication server in the event that the reference at the identity provider from the mobile communication device is the same as the reference provided by the identity provider to the client. The request sent from the client to the mobile communication device may be sent via a direct local connection. The request sent from the client to the mobile communication device may be sent via a wireless connection (such as a Bluetooth connection).

According to another aspect of the invention, there is provided an apparatus (such as an identity provider or a system including an identity provider and possibly additionally including an authentication module), comprising: a first input adapted to receive a request (such as an HTTP request) from a client for access to a service provider; a first output adapted to send an authentication response (e.g. an HTTP unauthorised response) to the client, the authentication response including a first reference; a second input (which may be the same physical input as the first input) for receiving a request from a mobile communication device known to an authentication server associated with the identity provider to identify a user at the client, the request including a second reference; and processing means (such as a comparator) adapted to compare the first and second references and, in the event that the first and second references are the same, obtaining identification information for the user of the mobile communication device from the authentications server. The apparatus may include a second output (which may be the same physical output as the first output) for providing the user credentials for the requested service provider to the client. The apparatus may be an identity provider that is provided by the same telecommunications provider that is used by the mobile communication device and that provider the authentication server.

According to a further aspect of the invention, there is provided an apparatus (such as an identity provider), comprising: a first input adapted to receive a request (such as an HTTP request) from a client for access to a service provider; a first output adapted to send an authentication response to the client, the authentication response including a first reference; and a second output for providing user credentials for the requested service provider to the client in the event that the first reference is the same as a second reference sent by a mobile communication device known to an authentication service associated with the identity provider. The apparatus may include processing means adapted to compare the first and second references. The processing means may form part of the identity provider or may be provided as a separate module that is trusted by the identity provider. The apparatus may further comprise means for obtaining identification information for the user of the mobile communication device from the authentication server. The apparatus may further comprise a second input for receiving a request from the mobile communication device to identify the user at the client, the request including a second reference; alternatively, the request may be received at a second module that is trusted by the identity provider.

The present invention further provides a system comprising a client, a mobile communication device and an identity provider, wherein the identity provider is provided by a telecommunication network provider that is used by the mobile communication device, wherein: the identity provider comprises a first input (or some other means) for receiving a request from the client for access to a service provider; the identity provider comprises a first output (or some other means) for sending an authentication response to a first input of the client, the authentication response including a first reference; the client comprises a first output (or some other means) for sending a request to a first input of the mobile communication device to identify the client at the identity provider, the request including the first reference; the mobile communication device comprises a first output (or some other means) for sending a request to the identity provider to identify the user of the client, the request including the first reference; processing means is provided (for example, as part of the identity provider) for comparing the reference sent by the identity provider to the client and the reference sent by the mobile communication device; and the identity provider comprises a second output (or some other means) for providing the requested authentication information to the client, in the event that the reference sent by the identity provider to the client and the reference received at the identity provider from the mobile communication device are the same. The system may also comprise means (for example, as part of the identity provider) for obtaining identification information for the user of the mobile communication device from an authentication server provided by the telecommunication network provider.

The present invention also provides a method (for example, for authenticating a user at a service provider using an identity provider provided by a telecommunication network provider), the method comprising: sending a request from a client to an identity provider requesting user credentials required to access a service provider; receiving, at the client, an authentication request from the identity provider to the client, the authentication request including a first reference; sending a request from the client to a mobile communication device used by the user of the client to identify the user at an identity provider, wherein the identity provider is provided by the provider of a telecommunications network to the mobile communication device; and receiving, at the client, authentication information for the service provider from the identity provider in the event that it is determined (for example, by the identity provider or by another function trusted by the identity provider) that the same user is operating the mobile communication device and the client.

The present invention yet further provides an apparatus (for example, for authenticating a user at a service provider using an identity provider provided by a telecommunication network provider) comprising: a first output for sending a request to an identity provider requesting user credentials required to access a service provider; a first input for receiving an authentication request from the identity provider, the authentication request including a first reference; and a second output for sending a request to a mobile communication device used by the user of the apparatus to identify the user at an identity provider, wherein the identity provider is provided by the provider of a telecommunications network to the mobile communication device, wherein the request includes the first reference.

The client may be a user device, such as a personal computer, having a suitable browser for accessing the service provider, for example via the Internet.

Thus, at least some forms of the invention provide a new authentication arrangement based on the secure authentication of a mobile communication device (or user equipment UE). This implementation can be a little bit less secure alternative to the 3GPP-GBA mechanism, which is not generally used as operators do not generally own/provide bootstrapping server function (BSF) servers, and mobile communication devices do not widely support 3GPP-GBA. However, the present invention can be used with a wide range of mobile communication devices without having to modify or install new elements (besides the Identity Management software) into the operator's network. The decreased security comes from the fact that the present solution either relies on a shared secret R (the "first reference") or relies on HTTPS/TLS connection between the identity provider and the client, whereas in the 3GPP-GBA solution, the shared secret (K) is generated both in the client and in the BSF and is never transferred on the network. Nevertheless, despite this decrease of security, the resulting solution is still at least as secure as the SMS-based solutions used widely nowadays for banking transactions (in which the shared secret (a passcode) is sent in the SMS). In fact, the present solution is more secure than the current SMS-based solutions, because the passcode in the latter is usually less than 10 characters long (approximately 60-bit entropy for alphanumeric passcodes of length 10), whereas the shared secret in the present solution can be arbitrarily long (128-bits in the examples given below, but, of course, other lengths could readily be implemented).

Furthermore, embodiments of the present invention are more secure than simple username/password authentication because a trusted end-device is used for the authentication itself, while entering username/password pairs into a web browser can be spoofed or phished.

A further advantage of embodiments of the invention is that an already existing authentication of the UE against the identity provider can be reused (for example, by relying on the already existing authentication of the UE against the network of a telecommunications network operator), while in current methods, the users would have to re-authenticate themselves to the identity provider upon closing the browser. The authentication comes from the UE and is kept stable, even over restarts of the client device.

In some forms of the invention, the identity provider provides the requested user credentials required to access the service provider on the basis of the identification information obtained from the authentication server.

The requested user credentials may be forwarded to the client, for example in response to a second request from the client. The user credentials may be sent directly from the identity provider to the client. Alternatively, the user credentials may be sent from the identity provider to the client via the mobile communication device. In an alternative embodiment of the invention, the user credentials are sent from the identity provider to the service provider (either in addition to, or instead of, being sent to the client)

In some forms of the invention, a second request for user credentials required to access the service provider is sent by the client to the identity provider. The second request may include the first reference.

In some forms of the invention, the identity provider generates a third reference. The third reference may be sent to the client, for example, either directly from the identity provider, or from the identity provider to the client via the mobile communication device. In forms of the invention including a second request issued by the client to the service provider, the second request may include the third reference (either in addition to, or instead of, the first reference).

In some forms of the invention, the first reference includes a URL. The mobile communication device may use the URL to contact the identity provider, thereby confirming that the mobile communication device has been informed of the first reference. The URL may appear in the inbox of the mobile communication device, so that the user can easily follow the link. Alternatively, the mobile communication device may be adapted to automatically follow the URL: such an arrangement is more convenient for the user, but it does require the mobile communication device to be provided with a mechanism (such as a locally installed application) for automatically following such a link.

In some forms of the invention, the first reference is encoded as a telephone number. The mobile communication device may use the telephone number to make contact with the identity provider (or with a third party who is in contact with the identity provider), thereby confirming that the mobile communication device has been informed of the first reference.

In some forms of the invention, the second reference is sent and/or received as a DTMF sequence (or a similar sequence). For example, the mobile communication device may be used to contact an authentication server or a identity provider using a particular telephone number. The second reference can then be entered using a DTMF (or similar) sequence.

The authentication information may be forwarded from the client to the service provider.

The request sent from the client to the mobile communication device may be sent via a direct local connection. The request sent from the client to the mobile communication device may be sent via a wireless connection (such as a Bluetooth connection). Other connection formats are possible.

The first reference discussed above (and also the second reference, which is generally the same as the first reference) may be a nonce. In an exemplary embodiment of the invention, the first reference is a hexadecimally encoded 128-bit nonce. In forms of the invention including a third reference, that reference may be a similar nonce.

The present invention also provides computer program product, comprising: means for receiving, at an identity provider provided by a telecommunications network provider, a request (e.g. an HTTP request) from a client for user credentials required to access a service provider; means for sending an authentication request (e.g. an HTTP Unauthorised response) from the identity provider to the client, the authentication request including a first reference; means for receiving, at the identity provider (or another function trusted by the identity provider), a request from a mobile communication device to identify a user at the client, the request including a second reference, wherein the mobile communication device makes use of the network provided by the telecommunication network provider and is known to an authentication server provided by the telecommunication network provider; and means for comparing the first and second references and, if they are the same, obtaining identification information (e.g. IMSI etc.) for the user of the mobile communication device from the authentication server provided by the telecommunication network provider.

The present invention also provides computer program, comprising: code for receiving, at an identity provider provided by a telecommunications network provider, a request (e.g. an HTTP request) from a client for user credentials required to access a service provider; code for sending an authentication request (e.g. an HTTP Unauthorised response) from the identity provider to the client, the authentication request including a first reference; code for receiving, at the identity provider (or another function trusted by the identity provider), a request from a mobile communication device to identify a user at the client, the request including a second reference, wherein the mobile communication device makes use of the network provided by the telecommunication network provider and is known to an authentication server provided by the telecommunication network provider; and code for comparing the first and second references and, if they are the same, obtaining identification information (e.g. IMSI etc.) for the user of the mobile communication device from the authentication server provided by the telecommunication network provider. The computer program may be a computer program product comprising a computer-readable medium bearing computer program code embodied therein for use with a computer.

The present invention further provides a computer program product comprising: means for sending a request from a client to an identity provider requesting user credentials required to access a service provider; means for receiving, at the client, an authentication request from the identity provider, wherein the authentication request includes a first reference; means for sending a request from the client to a mobile communication device that is also being used by the user of the client to identify the client at the identity provider, wherein the identity provider is provided by a provider of a telecommunications network to the mobile communications device, and wherein the mobile communication device makes use of the telecommunications network and is known to an authentication server provided by the authentication server; means for sending a request from the mobile communication device to the identity provider (or to another module, for example a module trusted by the identity provider) to identify the user of the client, the request to identify the user including the first reference; means for comparing, at the identity provider, the reference sent to the client and the reference received from the mobile communication device; and means for obtaining identification information for the user of the mobile communication device from the authentications server in the event that the reference received at the identity provider from the mobile communication device is the same as the reference provided by the identity provider to the client.

The present invention further provides a computer program comprising: code for sending a request from a client to an identity provider requesting user credentials required to access a service provider; code for receiving, at the client, an authentication request from the identity provider, wherein the authentication request includes a first reference; code for sending a request from the client to a mobile communication device that is also being used by the user of the client to identify the client at the identity provider, wherein the identity provider is provided by a provider of a telecommunications network to the mobile communications device, and wherein the mobile communication device makes use of the telecommunications network and is known to an authentication server provided by the authentication server; code for sending a request from the mobile communication device to the identity provider (or to another module, for example a module trusted by the identity provider) to identify the user of the client, the request to identify the user including the first reference; code for comparing, at the identity provider, the reference sent to the client and the reference received from the mobile communication device; and code for obtaining identification information for the user of the mobile communication device from the authentications server in the event that the reference received at the identity provider from the mobile communication device is the same as the reference provided by the identity provider to the client. The computer program may be a computer program product comprising a computer-readable medium bearing computer program code embodied therein for use with a computer.

Embodiments of the invention are described below, by way of example only, with reference to the following schematic drawings.

Figure 1:
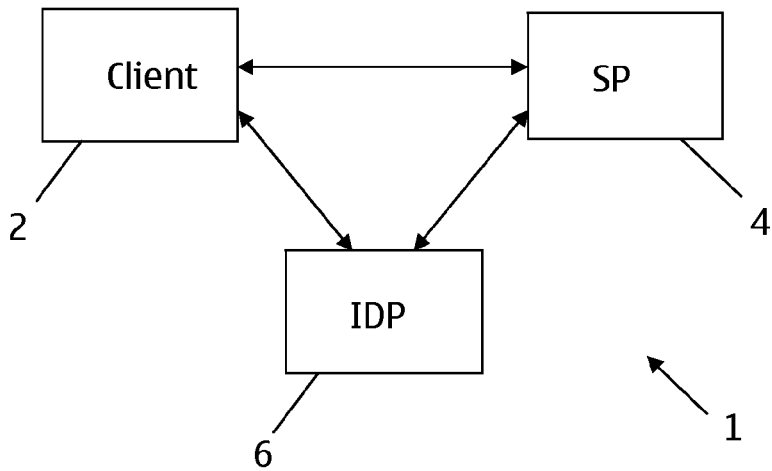
FIG. 1 is a block diagram demonstrating the use of identity management in the prior art.
Figure 2:
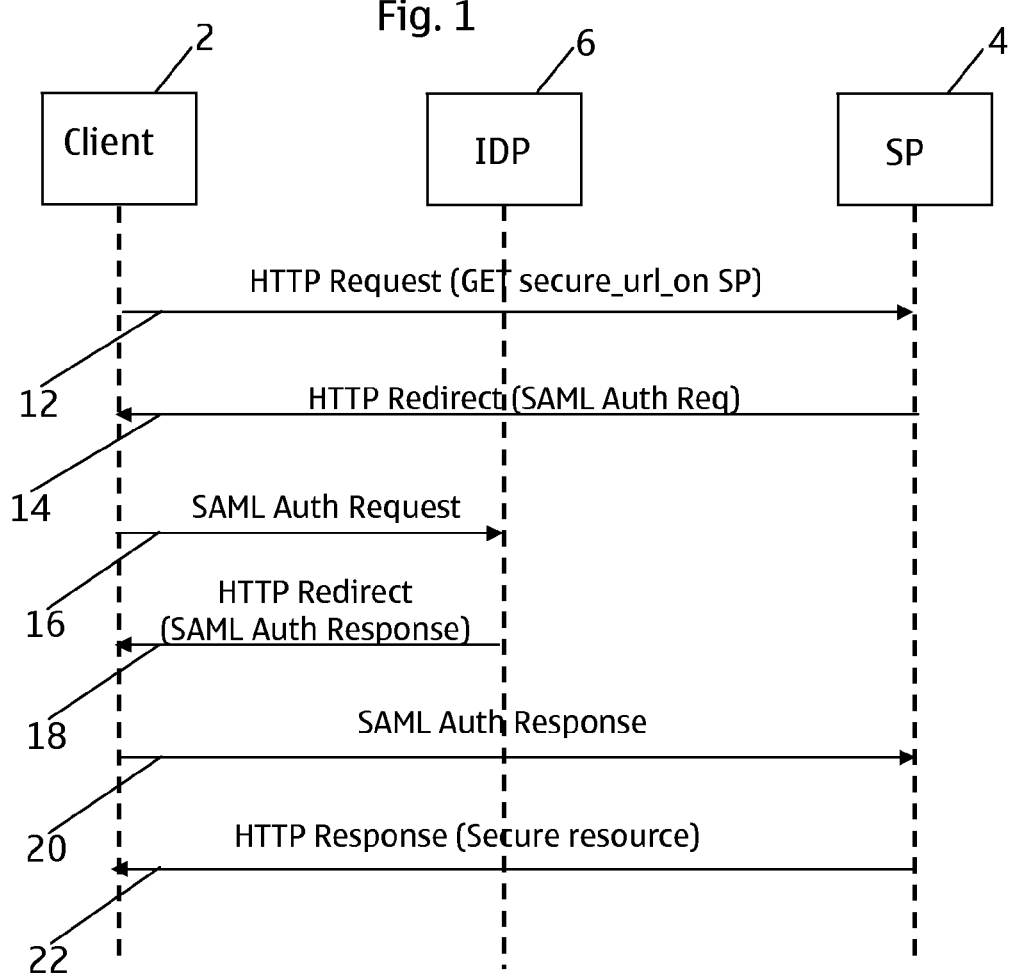
FIG. 2 is a message sequence showing an exemplary use of the system of FIG. 1.
Figure 3:
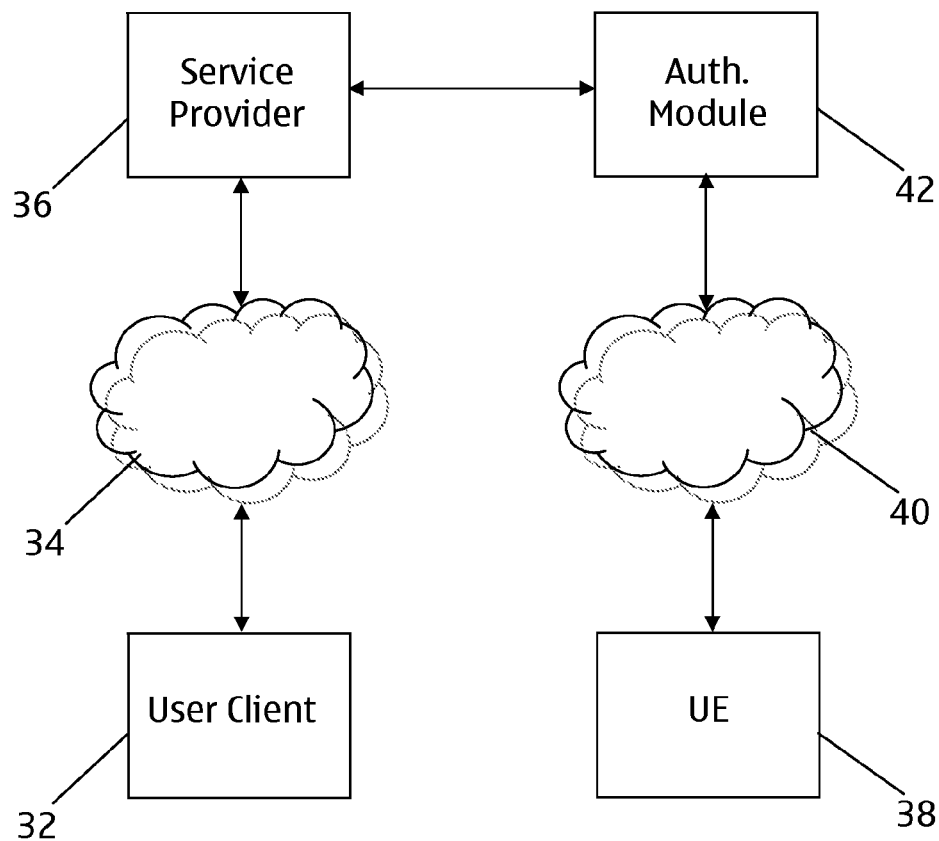
FIG. 3 is a block diagram of a system for providing user credentials.
Figure 4:
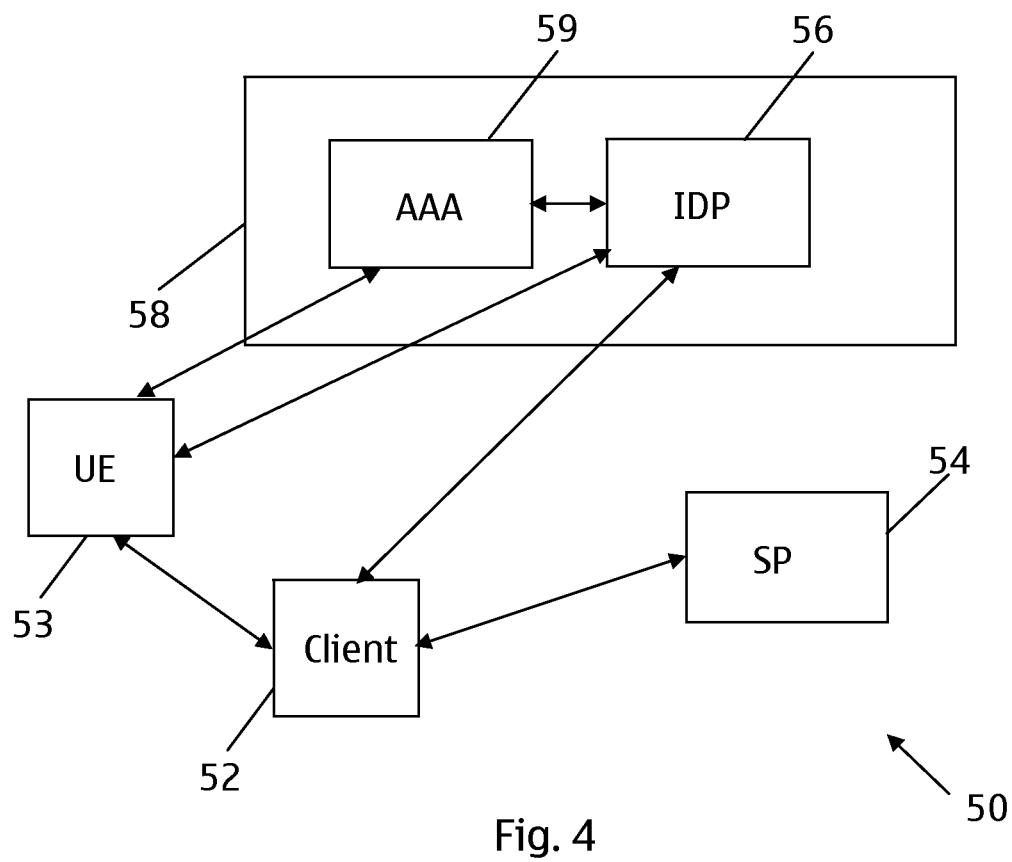
FIG. 4 is a block diagram of a system for providing user credentials in accordance with an aspect of the present invention.

FIG. 4 is a block diagram of a system, indicated generally by the reference numeral 50, in accordance with an aspect of the present invention. The system 50 comprises a client device 52 (for example, a personal computer or some other device having a suitable browser), a UE 53, a service provider 54, an identity provider 56 provided within the domain of a telecommunications operator 58 (for example, a mobile network operator) and an Authentication, Authorization and Accounting (AAA) server 59 also provided within the domain of the operator 58.

The client device 52 is in two-way communication with the UE 53, the service provider 54 and the identity provider 56. The client requests access to a service provided by a service provider 54. The identity provider 56 is used to provide user credentials for the user at the client 52. The user of the client device 52 is also using the UE 53, with that UE making use of the network provided by the telecommunications operator 58; the UE 53 is in two-way communication with the identity provider 56 and the AAA server 59 (as well as with the client 52).

The identity provider 56 is in two-way communication with the AAA server 59 and uses that server to identify the user of the UE 53.

Figure 5:
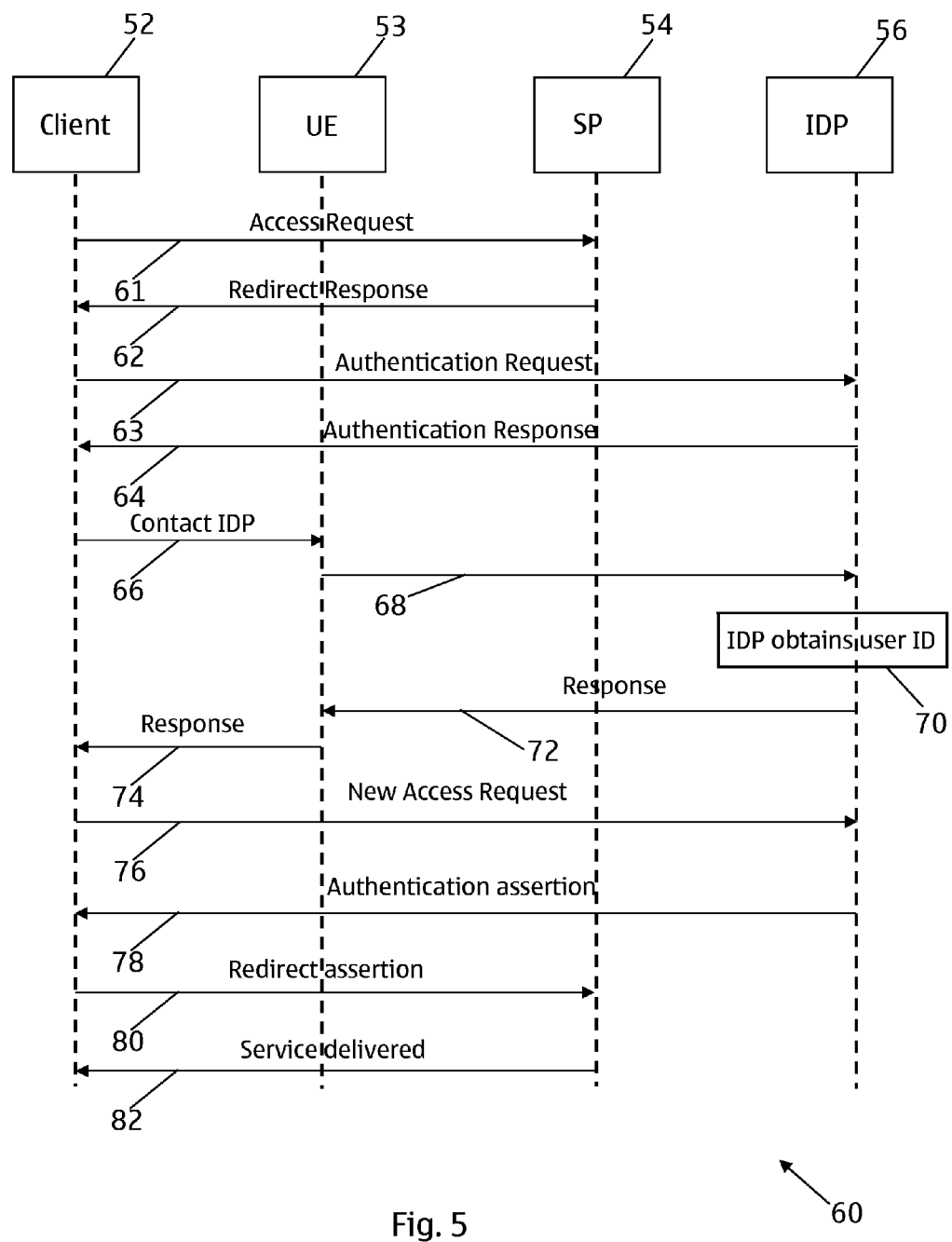
FIG. 5 is a message sequence showing an exemplary use of the system of FIG. 4, in accordance with an aspect of the present invention.

FIG. 5 is a message sequence, indicated generally by the reference numeral 60, demonstrating an exemplary use of the system 50, in accordance with an aspect of the present invention.

The message sequence 60 begins with the user client 52 issuing a request 61 (typically an HTTP Request) to the service provider 54, requesting access to a secure resource at the service provider. In response to the request 61, the service provider issues a redirect message 62 (such as an HTTP Redirect message), instructing the client 52 to obtain user credentials from a particular identity provider (i.e. the identity provider 56). In response to the redirect message 62, the client 52 sends a message 63 to the identity provider 56 seeking the authentication details required to access a service provided by the service provider 54. The message 63 may, for example, be an HTTP or HTTPS message.

On receipt of the message 63, the identity provider 56 determines that the user client 52 is not authenticated at the identity provider and responds to the message 63 by sending a message 64 asking the user client to authenticate itself to the satisfaction of the identity provider 56. The message 64 includes a reference R, as discussed further below.

The message 64 may be sent as a special HTTP response, and this HTTP response is recognized at the client 52 by an extension to the browser. The extension can also be contained within the HTTP response (e.g. an HTML-Page containing a Java Applet or active-X plugin).

The authentication response 64 may take the form of an HTTP 401 Unauthorized response, in which the realm field of the WWW-Authenticate header contains a specific string, e.g.:

```
HTTP/1.1 401 Unauthorized
...
WWW-Authenticate: Digest
realm="subscriber@op.com/idp/authn"
nonce="2f912500331194eca44daefeba0df871" ...
...
``` where the hexadecimal encoded 128-bit nonce is the reference R discussed further below. The special realm value triggers the client 52 to perform the rest of the message sequence 60.

On receipt of the message 64, the client 52 sends a message 66 to the UE 53, instructing the UE to contact the identity provider 56 in order to convince the identity provider that the user of the client 52 is the same as the user of the UE 53, which user is already known to the AAA server 59. The message 66 includes the reference R that was provided by the identity provider 56. In this way, the UE 53 obtains the reference R.

In response to the message 66, the UE 53 sends a message 68 to the identity provider 56. The message 68 includes the reference R that was included in the messages 64 and 66 described above. The reference R is used by the identity provider 56 to correlate the request 68 from the UE 53 with the earlier authentication request 63 received from the client 52.

The message 66 sent from the client 52 to the UE 53 may include the following URL:

https://p.com/idp/authn/2f912500331194eca44daefeba0d
   f871 in which the reference R (2f912500331194eca44daefeba0df 871 in this example) is included as part of the URL.

In message 68, the UE 53 may contact the identity provider at the above URL, thereby confirming to the identity provider that the UE 53 has been informed of the reference R and must therefore be connected with the user of the client device 52. The HTTPS scheme is denoted in the URL for higher security, but if the implementer trusts the encryption of the radio interface between the UE and the operator's network, then HTTP may be used.

At this stage, the identity provider 56 can determine from the reference R that the same user is at the client 52 and the UE 53. Next, at step 70, the identity provider retrieves the user ID for the user of the UE 53 from the AAA server 59. This user ID is typically an internal identifier (e.g. IMSI, MSISDN).

The identity provider 56 may retrieve the user ID based on the source IP address or it may receive it as an asserted ID in an HTTP header.

Based on the user ID retrieved at step 70, the identity provider 56 is able to provide the authentication assertion to the service provider. However, because an authentication assertion is typically provided by an identity provider as a response to a request, and is transferred to the service provider via the client device by means of Web redirection, the message sequence 60 includes a number of further steps.

In response to the request 68, the identity provider 56 sends a response 72 to the UE 53 (the originator of the request 68) and the UE 53 returns a response to the client 52 (response 74). The client 52 then sends a further request (access request 76) to the identity provider.

The identity provider now knows the identity of the client 52 and can therefore respond to the access request 76 by providing an authentication assertion 78 to the client 52. The assertion is sent from the client 52 to the service provider 54 as message 80. On receipt of the message 80, the service provider 54 checks the assertion and then deliver the request service to the user 52 (message 82).

The message sequence 72, 74 and 76 may take a number of different forms, as described further below.

In one embodiment of the invention, the response 72 sent from the identity provider 56 to the UE 53 includes a secret value S (which is in fact another nonce):

```
HTTP/1.1 200 OK
...
Content-Type: text/plain
Content-Length: 32
465b5ce8b199b49faa5f0a2ee238a6bc
``` where the hexadecimal encoded 128-bit nonce (465b5ce8b199b49faa5f0a2ee238a6bc) is the secret value S.

The client 52 contacts the identity provider once again, in message 76 requesting access to the service provider, in a similar manner to the request 63.

In message 76, when contacting the identity provider once again, this request must be linked to the Client's first request (message 63). This may be done e.g. by including the reference R into the request

```
GET /idp HTTP/1.1
Host: op.com
...
Authorization: Digest username=""
realm="subscriber@op.com/idp/authn"
nonce="2f912500331194eca44daefeba0df871" response="..."
...
``` where the nonce value again plays the role of the reference R, the username is left intentionally empty and the response is calculated from this empty username and the secret value S treated as a password, by means of the HTTP Digest response calculation algorithm as specified by RFC 2617. The identity provider can then verify the authenticity of this request by verifying the response against the shared secret value S (doing the same calculation as the client 52).

In an alternative form of the invention, for example, when the connection between the client 52 and the identity provider 56 is secure, e.g. based on HTTPS, then the message sequence 72, 74 and 76 can be simplified as follows.

In step 70, when the identity provider 56 has received the request 68 from the UE, it is convinced that the user sitting behind the original connection (message 63) is the same user as the one owning the UE 53, because of the reference R (the nonce) which is acting as a shared secret. So the identity provider does not have to return another shared secret (the nonce S discussed above); it is enough to respond with HTTP 200 OK with no payload.

In message 76, when contacting the identity provider 56 once again, the client 52 does not need to include an Authorization header at all (assuming that the underlying connection (such as a TLS connection) has been maintained.

Regardless of the implementation of the steps 72, 74 and 76, the request 76 is sent to the identity provider 56 and the identity provider provides a response to that request, in accordance with the SAML protocol. The message 78 returns the authentication assertion for the requested service to the client 52. The client 52 then forwards the assertion to the service provider as message 80 and the service provider delivers the requested service (message 82), as discussed above.

Note that the authentication assertion will typically contain a different identifier than the user ID retrieved in step 70: an identifier/pseudonym specific to service provider 54; the mapping is maintained by the identity provider.

In the example discussed above, the message 68 including the reference R is described as being sent from the UE 53 to the identity provider 56. This is not essential to all embodiments of the invention. For example, the message 68 may be sent to another device that is trusted by the identity provider. That other device may compare to reference sent from the identity provider 56 to the client 52 (as part of the message 64) and inform the identity provider whether or not the references match. In order for the user credentials to be provided to the client 52, the identity provider 56 needs to be convinced that the same user is operating the client and the UE; this is done by comparing the references discussed above, but it does not matter to the invention whether or not the identity provider itself carries out that comparison.

It should also be noted that although the message sequence 60 has been described in line with the SAML protocol, this is not an essential requirement of the invention. For example, having retrieved the user ID in step 70, the identity provider could simply return the user credentials required by the service provider 56 to the client 52, without needing to wait for a further request (thereby omitting the steps 72, 74 and 76 of the message sequence). Furthermore, having retrieved the user ID in step 70, the identity provider could simply return the user credentials required by the service provider 56 to the service provider itself (thereby omitting the steps 72, 74 and 76 of the message sequence 60, sending the message 78 to the service provider instead of (or in addition to) the client and omitting step 80 of the message sequence).

As described above, the client 52 sends a message 66 instructing the UE 53 to contact the identity provider 56. The message 66 may be transferred from the client 52 to the UE 53 in any one of a number of ways. A number of options are discussed below, although the skilled person would be aware of alternatives that could be used.

In one embodiment of the invention, the message 64 contains a Web address of the identity provider 56. The address also contains the reference R, e.g. as a URL parameter. In message 66, this address is passed on to the UE by standard Bluetooth means (OBEX). In message 68, the UE contacts the address via cellular access (e.g. GPRS, 3G etc.).

In this case, the user typically receives the Web link into their inbox on the UE 53, has to open it and then follow the link.

Alternatively, the protocol used for passing the Web address on to the UE may be proprietary and the server on the UE is implemented as a MIDlet (a JAVA application that is typically implemented on a Java-enabled mobile device). In this case, the Web link is automatically followed by the UE. The use of a MIDlet or some other arrangement that enables the UE to automatically follow a link is clearly more convenient for the user than providing a link that needs to be manually followed at the UE by the user. On the other hand, this case requires the deployment of the MIDlet (or some other application) to the UE 53. This way, even more security can be used, because the connection between the UE 53 and the identity provider 56 is not necessarily based on HTTP.

In a further alternative, the UE is reached not via Bluetooth, but by some other means of short-range connectivity, such as an infrared connection.

Thus, the connection between the client 52 and the UE 53 can take many forms, many of which are secure, e.g. based on Bluetooth pairing, cable connection, data encryption and authentication in case of WLAN, etc.

In yet a further alternative, the received authentication request (message 64) contains a telephone number (e.g. a so-called service number such as *1234567890#). The number itself encodes the reference R, i.e. the number is unique to the request. In message 66 the following steps are performed:
    The client 52 instructs the UE 53 via a USB link (or some other connection) to call this number.
    The UE 53 places a call.
    The identity provider 56 gets contacted by the network function that has processed the call.

In a further alternative, the received authentication request (message 64) contains a telephone number and a separate number which in fact is the reference R, i.e. the number is unique to the request. In the message 66 the following steps are performed:
    The client 52 instructs the UE 53 via a USB link (or Bluetooth or some other connection) to call this telephone number.
    The UE 53 places a call.
    The client 52 instructs the UE 53 to send the digits of the number R as a DTMF (dual-tone multi-frequency) sequence (or in some other way).
    The UE 53 sends the DTMF sequence.
    The identity provider 56 gets contacted by the network function that has processed the call.

In message 66, the client 52 can use a proprietary remote call initiation function of the UE, for example, or it could contact a MIDlet on the UE which in turn could initiate the call. Other examples will be apparent to the person skilled in the art.

It should be noted that an embodiment of the invention may combine two or more of the arrangements discussed above (e.g. Web link via USB, Call via Bluetooth, etc).

The communications between the client 52 and the UE 53 can take many forms. For example, communications between the client 52 and the UE 53 may be based on shared files, provided that the UE can also appear as a mass storage to the client via a USB (or some other) connection; or the UE may also be a card phone that can be physically connected to the client.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method comprising:
   receiving, at an identity provider provided by a telecommunications network provider, a request from a client for user credentials required to access a service provider;
   sending an authentication request from the identity provider to the client, the authentication request including a first reference;
   receiving a request from a mobile communication device to identify a user at the client, the request from the mobile communication device including a second reference provided to the mobile communication device by the client, wherein the mobile communication device utilizes a network provided by the telecommunication network provider and is known to an authentication server provided by the telecommunication network provider; and
   comparing the first and second references and, when they are the same, obtaining identification information for the user of the mobile communication device from the authentication server provided by the telecommunication network provider.

2. A method as claimed in claim 1, wherein the first reference is encoded as a telephone number.

3. A method as claimed in claim 1, wherein the second reference is received as a dual-tone multi-frequency (DTMF) sequence.

4. A method as claimed in claim 1, wherein the comparing of the first reference sent to the client and the second reference received from the mobile communication device is carried out at the identity provider.

5. A method as claimed in claim 1, wherein the identity provider provides the requested user credentials required to access the service provider on the basis of the identification information obtained from the authentication server.

6. A method as claimed in claim 1, further comprising forwarding the requested user credentials to the client.

7. A method as claimed in claim 6, wherein the user credentials are forwarded to the client in response to a second request from the client.

8. A method as claimed in claim 7, wherein the second request includes the first reference.

9. A method comprising:
   sending a request from a client to an identity provider requesting user credentials required to access a service provider;
   receiving, at the client, an authentication request from the identity provider, wherein the authentication request includes a first reference;
   using the client to send a request to a mobile communication device that is also being used by a user of the client to identify the client at the identity provider, wherein the identity provider is provided by a provider of a telecommunications network to the mobile communications device, and wherein the mobile communication device is known to an authentication server provided by the provider of the telecommunications network;
   using the mobile communication device to send a request to the identity provider to identify the user of the client, the request to identify the user including the first reference;
   comparing the first reference sent to the client and a second reference received from the mobile communication device; and
   using the identity provider to obtain identification information for the user of the mobile communication device from the authentication server when the second reference received at the identity provider from the mobile communication device is the same as the first reference provided by the identity provider to the client.

10. A method as claimed in claim 9, wherein the request sent from the client to the mobile communication device is sent via a direct local connection.

11. A method as claimed in claim 9, wherein the request sent from the client to the mobile communication device is sent via a wireless connection.

12. A method as claimed in claim 9, wherein the first reference includes a Uniform Resource Locator (URL) that is included in the request sent from the client to the mobile communication device.

13. A method as claimed in claim 9, wherein the first reference is encoded as a telephone number.

14. A method as claimed in claim 9, wherein the second reference is received as a dual-tone multi-frequency (DTMF) sequence.

15. A method as claimed in claim 9, wherein the comparing of the first reference sent to the client and the second reference received from the mobile communication device is compared at the identity provider.

16. A method as claimed in claim 9, wherein the requested user credentials required to access the service provider on the basis of the identification information is obtained from the authentication server, via the identity provider.

17. A method as claimed in claim 9, further comprising receiving the requested user credentials at the client.

18. A method as claimed in claim 17, wherein the user credentials are received at the client in response to a second request from the client.

19. A method as claimed in claim 18, wherein the second request includes the first reference.

20. An apparatus, comprising:
   a first input configured to receive a request at an identity provider provided by a telecommunications network provider from a client for user credentials required to access a service provider;
   a first output configured to send an authentication response from the identity provider to the client, the authentication response including a first reference;
   a second input configured to receive a request from a mobile communication device to identify a user at the client, the request from the mobile communication device including a second reference provided to the mobile communication device by the client, wherein the mobile communication device is configured to utilize a network provided by the telecommunication network provider; and
   a second output configured to provide user credentials, for the user of the mobile communication device and from an authentication server provided by the telecommunication network provider, for the requested service provider to the client when, compared with the second reference provided by the client to the mobile communication device and sent by the mobile communication device known to an authentication server associated with the identity provider provided by the telecommunications network provider, the first reference is the same as the second reference.

21. A computer program product, comprising:
   means for receiving, at an identity provider provided by a telecommunications network provider, a request from a client for user credentials required to access a service provider;

means for sending an authentication request from the identity provider to the client, the authentication request including a first reference;

means for receiving a request from a mobile communication device to identify a user at the client, the request from the mobile communication device including a second reference provided to the mobile communication device by the client, wherein the mobile communication device utilizes a network provided by the telecommunication network provider and is known to an authentication server provided by the telecommunication network provider; and means for comparing the first and second references and, when they are the same, obtaining identification information for the user of the mobile communication device from the authentication server provided by the telecommunication network provider.

* * * * *